United States Patent
Thibeault et al.

(10) Patent No.: US 8,345,557 B2
(45) Date of Patent: Jan. 1, 2013

(54) AUTOMATED MONITORING OF A NETWORK

(75) Inventors: Brian K. Thibeault, Attleboro, MA (US); Eugene M. Tucciarone, N. Smithfield, RI (US)

(73) Assignee: General Instrument Corporation, Horsham, PA (US)

( * ) Notice: Subject to any disclaimer, the term of this patent is extended or adjusted under 35 U.S.C. 154(b) by 1082 days.

(21) Appl. No.: 11/171,066

(22) Filed: Jun. 30, 2005

(65) Prior Publication Data

US 2007/0002752 A1  Jan. 4, 2007

(51) Int. Cl.
 *H04L 12/26* (2006.01)
(52) U.S. Cl. .......................................... 370/241
(58) Field of Classification Search .............. 370/241, 370/242, 243, 244, 245, 246, 247, 248, 249, 370/250, 251, 252, 253; 725/107; 375/222, 375/224

See application file for complete search history.

(56) References Cited

U.S. PATENT DOCUMENTS

| | | | |
|---|---|---|---|
| 6,230,326 B1 * | 5/2001 | Unger et al. | 725/111 |
| 6,588,016 B1 * | 7/2003 | Chen et al. | 725/111 |
| 6,646,677 B2 | 11/2003 | Noro et al. | |
| 6,662,135 B1 * | 12/2003 | Burns et al. | 702/120 |
| 6,757,253 B1 * | 6/2004 | Cooper et al. | 370/241 |
| 6,928,475 B2 * | 8/2005 | Schenkel et al. | 709/224 |
| 2002/0116493 A1 | 8/2002 | Schenkel et al. | |
| 2005/0010958 A1 * | 1/2005 | Rakib et al. | 725/111 |
| 2005/0025145 A1 | 2/2005 | Rakib et al. | |
| 2005/0058082 A1 * | 3/2005 | Moran et al. | 370/252 |

OTHER PUBLICATIONS

PCT International Search Report, Application No. PCT/US06/19648, dated Aug. 15, 2007.
Office Action, Korean App. No. 10-2007-7030915 (English Translation), Dec. 21, 2009.
Office Action, Korean App. No. 10-2007-7030915 (Foreign Text), Nov. 27, 2009.
Mexican Office Action for Mexican Application No. MX/a/2007/015249, dated Dec. 9, 2009. (foreign text).
Mexican Office Action for Mexican Application No. MX/a/2007/015249, dated Dec. 22, 2009. (english translation).
Supplementary European Search Report European Patent Office, The Hague, Jan. 26, 2012, all pages.

* cited by examiner

*Primary Examiner* — Mark Rinehart
*Assistant Examiner* — Christopher R Crompton
(74) *Attorney, Agent, or Firm* — Lori Anne D. Swanson (57) ABSTRACT

A spare receiver in a CMTS is used to determine the connectivity status of the receivers of the CMTS in the network. Load balancing and Spectrum Groups may also be determined according to the connectivity status of the receivers. The spare receiver is configured to have the communication protocols of a first selected receiver of the CMTS and is switched to be connected to the signal lines of another receiver of the CMTS. A transmitter sends a request for a response to a modem registered with the first receiver. If the spare receiver, which is configured to have the same communication protocols as the first receiver of the CMTS, receives the response from the modem, the other receiver under test is determined to be physically wired with the first receiver. The other receiver is also determined to be in the same Load Balancing Group and the same Spectrum Group as the first receiver of the CMTS. The selected first receiver is analyzed against all of the other receivers in the CMTS by selectively switching the spare receiver to be connected to other receivers. Each receiver on the CMTS is analyzed in the same manner as the selected first receiver.

12 Claims, 6 Drawing Sheets

AUTOMATED MONITORING OF A NETWORK

FIELD OF THE INVENTION

This invention relates to automated monitoring of a network to ensure the integrity of the network system. This invention more particularly relates to detecting how a cable system is actually wired so cable operators can determine if the plant is really wired the way they intended and components are assigned to the correct Load Balancing and Spectrum Groups.

BACKGROUND

Coaxial cable television systems have been in widespread use for many years and extensive networks have been developed. The extensive and complex networks are often difficult for a cable operator to manage and monitor. Particularly, a typical cable network generally contains a headend which provides content to a cable modem termination system (CMTS) containing several receivers, each receiver is usually connected to modems of many subscribers, e.g., a single receiver may be connected to hundreds of modems. In many instances the operator will cable multiple receivers together to serve a particular area of a town or city.

Cable operators often use Load Balancing Groups to equalize the load of the traffic across receivers, and Spectrum Groups to allocate multiple upstream frequencies to a receiver. In order to have receivers belong to the same Load Balancing Group or Spectrum Group they must be physically connected together. Multiple frequencies in a Spectrum Group may be used for frequency agility whenever the CMTS detects that the frequency a receiver is currently using has communication problems, such as having high noise levels. The CMTS can determine which "backup" frequency is the best to use and retune the receiver in the Spectrum Group to the new frequency with no interruption to cable subscribers.

In order for cable operators to take advantage of the Load Balancing and Spectrum Group features they have to first manually configure every Load Balancing Group and Spectrum Group. For example, the Motorola BSR 64000 has 12 slots available for CMTS cards with 8 receivers on each card. The worse case scenario, but a common one, would be that the operator has to configure 48 Load Balancing Groups, with two upstreams per Load Balancing Group and/or 96 Spectrum Groups. These are time consuming efforts that can also be prone to errors for the cable operator. In some instances cable operators may not want to take advantage of these features because they do want to expend the resources to perform the manual configuration.

When cable operators do expend the resources to perform the manual configuration to setup Load Balancing and Spectrum Groups they typically need to do a lot of configuration to get it to run correctly. The Load Balancing Groups have to be logically configured exactly as they are physically wired. This process is can be error prone due to a mis-wiring or data entry error. Even if the CMTS was wired correctly there may still be bad connections or damaged cables.

Currently there is no existing way for the CMTS, to detect if a coaxial cable is loose, damaged or removed from the CMTS receiver. Today, for example, if someone removes the coaxial cable from a receiver port there is no way for the CMTS to detect that cable has been disconnected or broken, especially if the cable is broken a distance away from the CMTS receiver card input. Since many cable operators also wire multiple CMTS receivers together to act as a single Spectrum Group to support certain areas of a town/city, there can be numerous Spectrum Groups and wiring configurations which could lead to cabling mistakes. To make matters worse, internally the cable operator is likely to believe that a disconnected cable is still connected, resulting in incorrect data being provided to various monitoring systems, such as software algorithms for Load Balancing. Cable technicians often have difficulty determining if a problem is a configuration problem, a hardware problem or a software problem.

Currently there is no automated method for cable operators to detect how their CMTS is physically wired with the head end. There is also no method to automatically configure their Load Balancing Groups. Detecting how the CMTS is physically wired could help reduce down time for cable subscribers because this could help in detecting possible bad connections or cables.

SUMMARY

This invention describes exemplary methods and apparatus for detecting how a CMTS is connected in a cable headend, enabling the cable operators to determine if the network is really wired the way they intended.

This invention also provides for automatically configuring Load Balancing Groups and/or Spectrum Groups for a cable operator.

The invention helps simplify the configuration of CMTS products for cable operators. Automatically detecting the cable wiring and then configuring Load Balancing Groups for the operators is prone to fewer errors and ensures that the cable wiring and the configuration correspond with each other and reflect how their plant is really configured.

This invention also allows cable operators to determine if the cable has been disconnected or broken, and give the cable operators piece of mind knowing that the network is connected properly (i.e. that there are no bad, wrong or missing connections to the CMTS). This will help in debug problems in the field and save time and effort by technicians to restore cable service.

The invention utilizes a spare receiver to perform non-intrusive connectivity tests on the receivers on the CMTS card. The spare receiver allows us to determine how the primary receivers are cabled on the CMTS card. The invention allows the CMTS to be used as a head end debugging and self configuring tool for the cable network. The spare receiver preferably taps into the RF (Radio Frequency) circuit of the primary receivers in the CMTS.

The spare receiver is preferably configured to be identical with the first primary receiver (receiver 0). Then a modem registered on primary receiver 0 is selected and messages requesting a response are provided to the modem from the primary receiver. The spare receiver is matrixed to the other receivers (e.g. receiver 1) and "listens" for the response from the cable modem. Since the spare receiver is tuned to the same center frequency as primary 0 and only "listening" we can detect if receiver 1 is physically connected to receiver 0 and can store that information to be displayed to the operator later. If we did not hear any responses then receiver 1 is not physically connected to receiver 0 and that data may be displayed as well. A cable operator may determine if a cable is connected to the correct receiver or has been disconnected or broken.

The process may be repeated by setting up the spare receiver to matrix to all the other primary receivers (testing one at a time) to see if they are physically connected to receiver 0. The process may continue using the first receiver we found that is not connected to receiver 0. The spare receiver is preferably reconfigured to have the same communication protocols as the next primary receiver and its connectivity to other primary receivers is checked. When all receivers have been tested for physical connectivity the information can be displayed to the operator for examination to verify if it is wired correctly.

An apparatus for managing a network may comprise: a transmission unit capable of transmitting signals according to predetermined communication protocols; a plurality of receivers, each receiver being capable of receiving signals according to predetermined communication protocols; a spare receiver capable of receiving signals using the predetermined communication protocols of each of the plurality of receivers; and a switching unit which selectively connects the spare receiver to a signal line associated with one of the plurality of receivers, enabling the spare receiver to receive signals sent to a selected one of the plurality of receivers.

The apparatus for managing the network may further comprise a microprocessor configured to instruct the spare receiver to receive signals using a predetermined communication protocol of a first selected receiver of the plurality of receivers and to instruct the switching unit to connect the spare receiver to another selected receiver of the plurality of receivers.

In the apparatus for managing the network, when the transmission unit preferably sends a request for a response to a modem connected to the network to respond to the first selected receiver, the first selected receiver is determined to be connected to the other receiver if the spare receiver receives a response from the modem to the request for a response.

In the apparatus for managing the network, when the transmission unit preferably sends a request for a response to a modem connected to the network to respond to the first selected receiver, the first selected receiver is determined to be in the same Load Balancing Group as the other receiver if the spare receiver receives a response from the modem to the request for a response.

In the apparatus for managing the network, when the transmission unit preferably sends a request for a response to a modem connected to the network to respond to the first selected receiver, the first selected receiver is determined to be in the same Spectrum Group as the other receiver if the spare receiver receives a response from the modem to the request for a response.

A method of controlling a network having a plurality of receivers and a spare receiver may comprise the steps of: configuring the spare receiver to substantially communicate with communication protocols associated with a first selected receiver of the plurality of receivers; connecting the spare receiver to a signal line associated with another receiver of the plurality of receivers; providing a request for information from a transmission unit to a modem connected to the first selected receiver; and determining if the spare receiver detects a response from the modem.

In the method of controlling a network, if the spare receiver detects a response from the modem, the other receiver may be determined to be wired to the first selected receiver.

In the method of controlling a network, if the spare receiver detects a response from the modem, the other receiver may be determined to be in a Load Balancing Group with the first selected receiver.

In the method of controlling a network, if the spare receiver detects a response from the modem, the other receiver may be determined to be in a Spectrum Group with the first selected receiver.

A computer readable medium may contain instructions for a processor to control a network having a plurality of receivers and a spare receiver, the computer readable medium may contain instructions for the processor to perform the steps of: configuring the spare receiver to substantially communicate with communication protocols associated with a first selected receiver of the plurality of receivers; connecting the spare receiver to a signal line associated with another receiver of the plurality of receivers; providing a request for information from a transmission unit to a modem connected to the first selected receiver; and determining if the spare receiver detects a response from the modem.

In the computer readable medium, if the spare receiver detects a response from the modem, the other receiver may be determined to be wired to the first selected receiver.

In the computer readable medium, if the spare receiver detects a response from the modem, the other receiver may be determined to be in a Load Balancing Group with the first selected receiver.

In the computer readable medium, if the spare receiver detects a response from the modem, the other receiver may be determined to be in a Spectrum Group with the first selected receiver.

The invention allows non-intrusive connectivity tests on all the receivers on a CMTS card. The invention also allows a cable operator to determine how the primary receivers are cabled on the CMTS card and can automatically configure all the Load Balancing Groups for the cable operator so they can take advantage of all the features of Load Balancing Groups and/or Spectrum Groups with little or no manual configuration on their part. The techniques of the invention can be practiced without loss of service for any subscriber because they do not have to use any active receivers for testing. Even voice calls should not be affected by any of the testing.

DETAILED DESCRIPTION OF THE DRAWINGS

Figure 1:
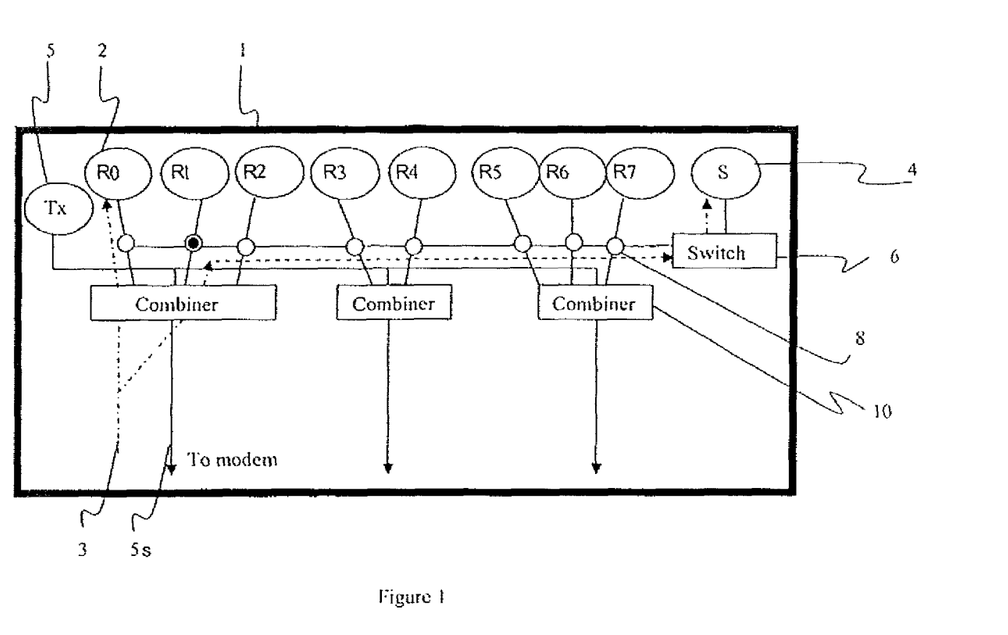
FIG. 1 illustrates an exemplary architecture of a CMTS in accordance with the principles of the invention.

FIG. 1 illustrates an exemplary CMTS 1 with primary receivers 2 (R0-R7), which may be a Motorola BSR64000 CMTS. A transmitter unit 5 is also illustrated which serves to transmit signals to modems of the users (not shown) via signal path 5s and combiner 10. Transmitter unit 5 may be a single transmitter or multiple transmitters. Those of skill in the art will appreciate that transmitter unit 5 preferably transmits to the modems according to predetermined communication protocols, such as Data Over Cable Systems Interface Specification (DOCSIS) protocols.

While eight receivers are shown, those of skill in the art will appreciate that any number of receivers may be used. In the exemplary illustration, receivers R0, R1 and R2 are in one Load Balancing Group, receivers R3 and R4 are in another group and R5, R6 and R7 are in the last group. The spare receiver 4 can preferably tap into any one receiver R0-R7 at a time and, in the example of FIG. 1, is tapped into receiver 1 via tap 8. Combiner 10 receives signals from user modems and provides them to receivers 2 (R0-R7). Dotted line 3 depicts the return path that a response from a cable modem (not shown) to receiver R0 would take in the exemplary implementation of FIG. 1. Those of skill in the art will appreciate that the CMTS is used generally to refer to any suitable modem termination system, that the architecture illustrated is exemplary and any type of cabling (connections) may be used, such as coaxial wires, optical fibers, twisted pairs, and wireless connections.

Figure 2:
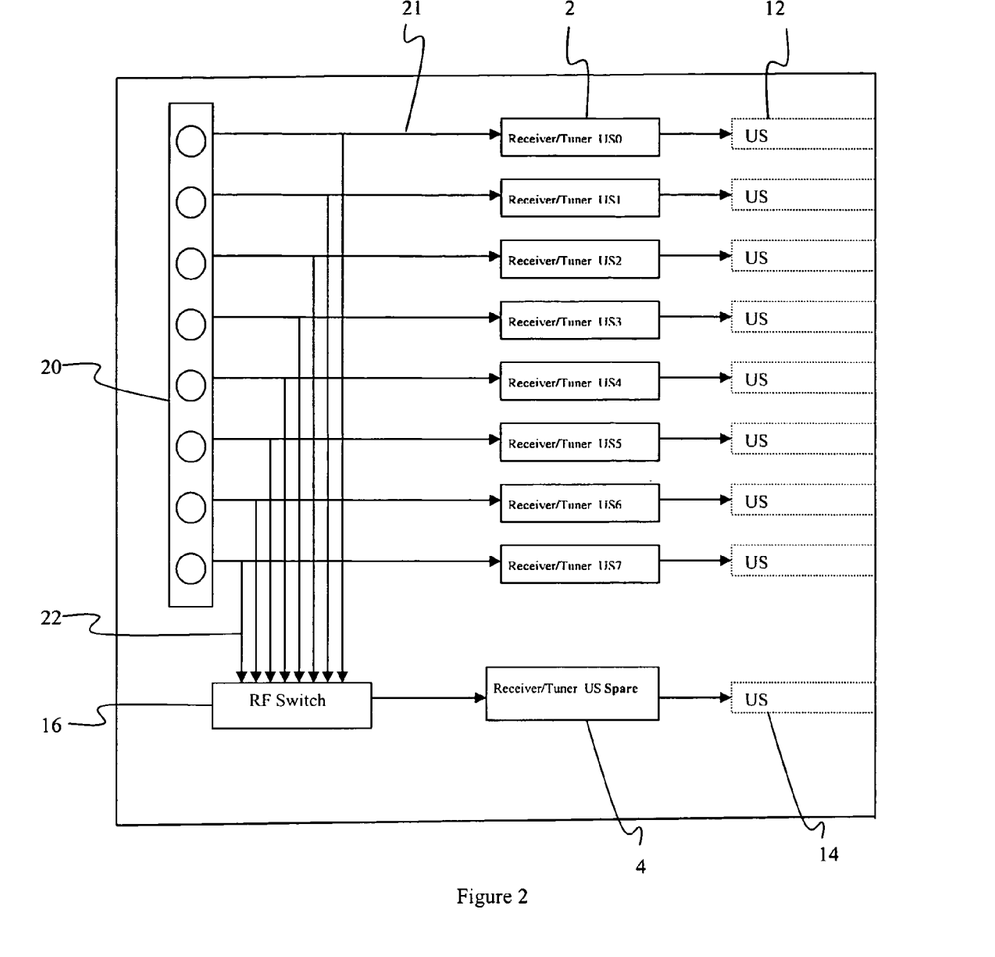
FIG. 2 illustrates an exemplary configuration for connecting a spare receiver in an exemplary CMTS in accordance with the principles of the invention.

FIG. 2 illustrates the spare receiver 4 tapped into each of primary receiver ports 2 (e.g. R0-R7) in a non-intrusive manner. As illustrated, CMTS receiver ports 20, which may be in the form of Amphenol connectors, are provided to allow cables, e.g. coaxial cables, (not shown) to be connected with primary receivers 2. As also illustrated, signals from the headend are preferably provided through ports 20 to receivers 2 and demodulators 12.

Spare receiver 4 preferably taps into signal lines 21 of primary receiver ports 20 via signal lines 22, and the taps are preferably located where the cable signal comes from receiver ports 20 into the receivers 2 so both the connected primary receiver 2 and the spare receiver 4 may receive the same signal. Those of skill in the art will appreciate that each of the primary receivers 2 (e.g. receivers R0-R7) receive signals according to different communication characteristics, e.g. communication on a different frequency (RF band) and communication protocols. Spare receiver 4 is preferably tunable to the RF bands of each of the primary receivers 2. Preferably, the spare receiver 4 connects (matrices) with only one primary receiver 2 at a time.

Figure 3:
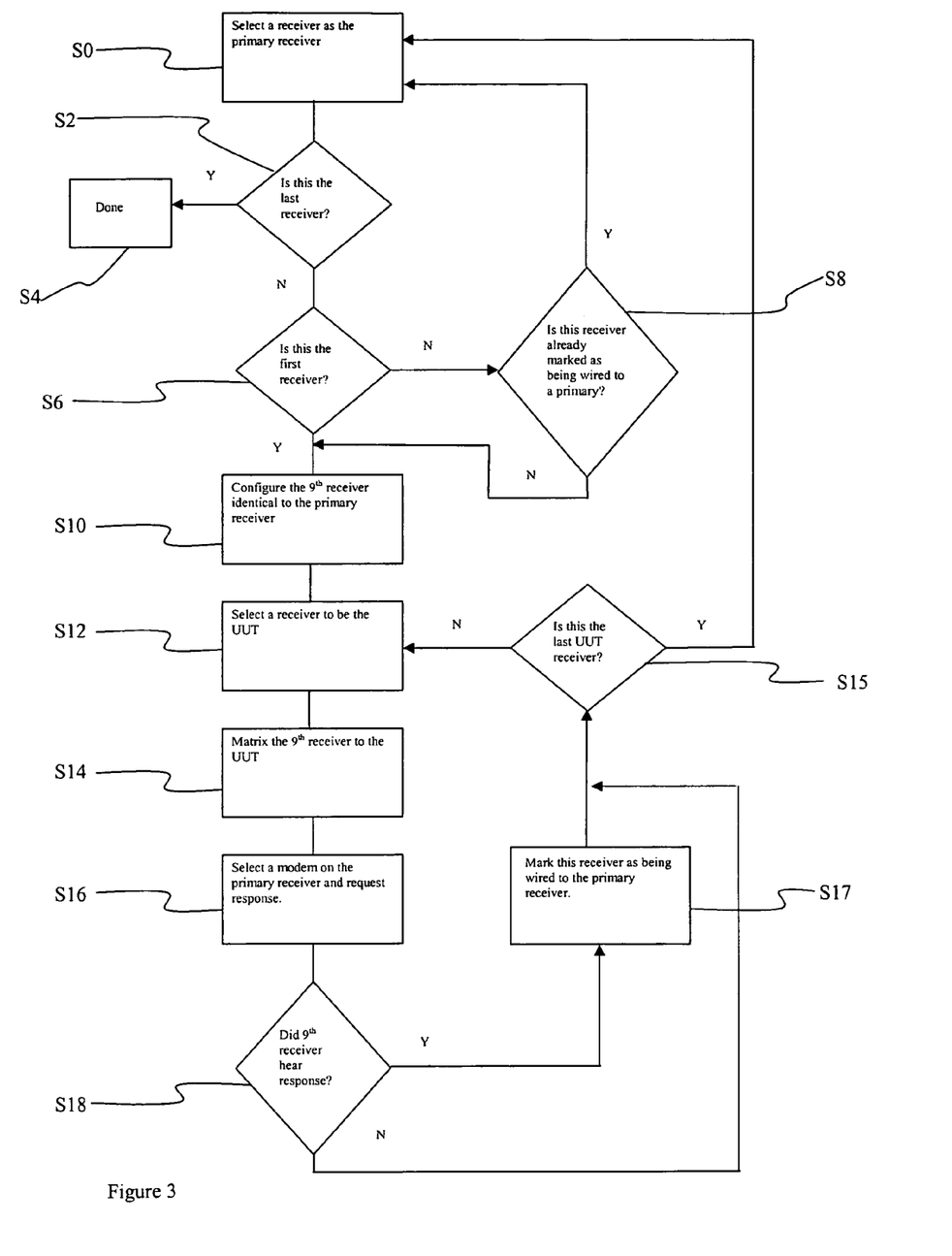
FIG. 3 illustrates an exemplary flow diagram of an exemplary process for determining cable connections of a CMTS according to the principles of the invention.

FIG. 3 illustrates an exemplary process to determine the connectivity of upstream receivers with a CMTS in accordance with the principles of the invention. As illustrated in FIG. 3, a primary receiver is selected to start the process, step S0. If the selected primary receiver is the only receiver available or remaining to be tested, step S2 Yes, then the process ends, step S4. If the selected receiver is not the last receiver, step S2 No, then a determination is made to see if it is the first receiver to be tested (e.g., upstream 0), step S6. If the selected receiver is not the first receiver to be tested, step S6 No (e.g., other receivers have already been tested), then it is determined whether the selected receiver has already been marked as being wired to another primary receiver, step S8. If the selected receiver has been marked as being wired to another primary receiver, step S8 Yes, then the process returns to the beginning, step S0, and selects a different primary receiver. If the selected receiver has not been marked, the process continues to analyze the selected primary receiver, step S8 No. As illustrated in step S10 the tunable spare receiver is preferably configured to the same communication parameters as the selected primary receiver, including being configured to communication characteristics of the same RF band and communication protocols (e.g. MAP data) utilized by the selected RF receiver being analyzed. In this manner, the spare receiver preferably is configured to receive communication directed toward the primary receiver being analyzed.

As further illustrated in FIG. 3, another primary receiver is selected as the receiver unit under test (UUT), step S12, to determine if it is connected to the receiver selected in step S0. Typically, the UUT will be the next higher number receiver, but may be any of the other primary receivers. As illustrated in step S14, the spare receiver is connected (matrixed) to the UUT, e.g. connected to the line in of the UUT. Then, as illustrated in step S16, a modem is selected which is registered on the receiver being analyzed (the receiver selected in step S0) and a communication request signal requesting a response from the modem is sent from the transmission unit 5 to the modem. Those of skill in the art will appreciate that the communication signal may be a "ping", a station maintenance request or any other signal requesting a response.

Because the spare receiver is configured to have the same communication characteristics as the receiver being analyzed (the receiver selected in step S0), when the modem responds to the communication request, both the receiver being analyzed and the spare receiver detect the response, if any, by the modem. If the spare receiver detects the modem response, step S18 Yes, then the UUT is marked as being wired to the primary receiver being analyzed, step S117. If the spare receiver did not hear the modem response, step S18 No, then the UUT is not wired together with the primary receiver being analyzed. Since certain responses may be expected within a predetermined period of time, the process may preferably determine if a response has been received within a predetermined period of time after the communication request.

If the UUT is not the last UUT receiver, step S15 No, then the process returns to step S12 and repeats steps S14-S18 and connects the spare receiver to the other UUT receiver (step S14) to determines if it is connected to the selected receiver being analyzed (selected in step S0). Once the last UUT receiver has been tested via steps S14-S18, as indicated by Yes in step S15, the process returns to step S0 and selects a different primary receiver to be analyzed. For example, if the process originally analyzed receiver R0, the next receiver R1 may be selected as the next receiver to be analyzed and the process illustrated in steps S2-S18 is repeated.

Those of skill in the art will appreciate that since the active receivers are not required to be used for testing, the process illustrated in FIG. 3 is non-intrusive to the cable network, and may be performed without causing a loss or disruption of service to subscribers. Even voice calls over the cable network should not be affected by any of the testing described above. The process in FIG. 3 may be performed periodically by a cable operator, e.g. once per week, every 24 hours, etc., and may also be initiated by a service call indicating problems or indicating a change in the cable network.

Figure 4:
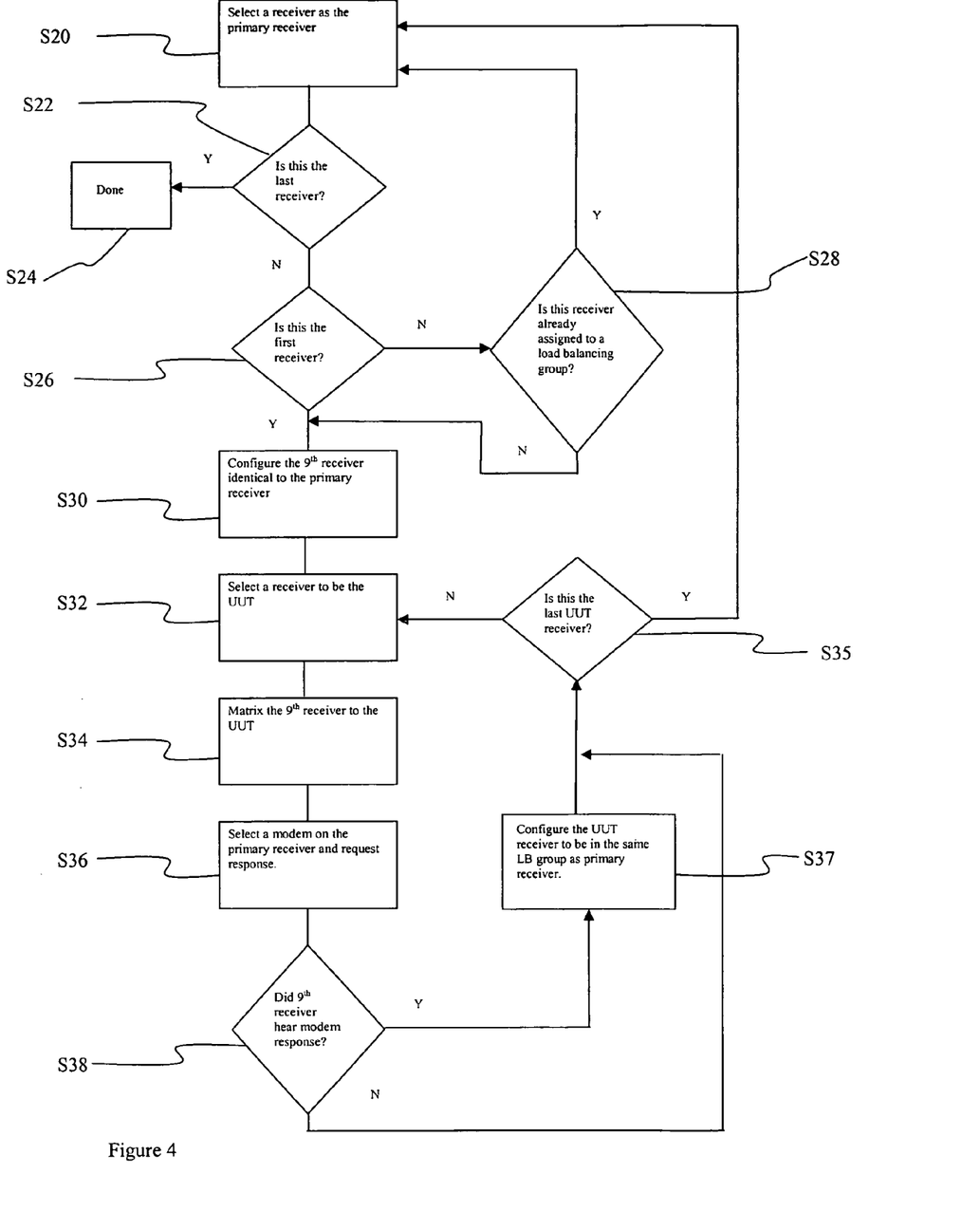
FIG. 4 illustrates an exemplary flow diagram of an exemplary process for determining Load Balancing Groups according to the principles of the invention.

FIG. 4 illustrates an exemplary process for determining Load Balancing Groups in the cable network. The process for Load Balancing Groups is similar to the process illustrated in FIG. 3, the discussion of which is herein incorporated. As illustrated in FIG. 4, a primary receiver is selected to start the process, step S20. If the selected primary receiver is the only receiver available or remaining to be tested, step S22 Yes, then the process ends, step S24. If the selected receiver is not the last receiver, step S22 No, then a determination is made to see if it is the first receiver to be tested (e.g., upstream 0), step S26. If the selected receiver is not the first receiver to be tested, step S26 No (e.g., other receivers have already been tested), then it is determined whether the selected receiver has already been assigned to a Load Balancing Group, step S28. If the selected receiver has already been assigned to a Load Balancing Group, step S28 Yes, then process returns to the beginning, step S20, and selects a different primary receiver. If the selected receiver has not been assigned, the process continues to analyze the selected primary receiver, step S28 No. As illustrated in step S30 the tunable spare receiver is preferably configured to the same communication parameters as the selected primary receiver, including being configured to communication characteristics of the same RF band and communication protocols (e.g. MAP data) utilized by the selected RF receiver being analyzed.

As further illustrated in FIG. 4, another primary receiver is selected as the receiver unit under test (UUT) and the UUT is tested, as illustrated in steps S32-S38, to determine if it is connected to the selected primary receiver in the same manner as described for steps S12-S18 in FIG. 3. Particularly, as illustrated in step S34, the spare receiver is connected (matrixed) to the UUT, e.g. to the line in of the UUT, a modem is selected which is registered with the receiver being analyzed (selected in step S20) and a communication signal requesting a response is sent from the transmission unit 5 to the modem. Those of skill in the art will appreciate that the communication signal may be a "ping", a station maintenance request or any other signal requesting a response. When the modem responds to the communication request, both the selected primary receiver and the spare receiver detect the response, if any, by the modem within a predetermined period of time. If the spare receiver hears the modem response, step S38 Yes, then the UUT receiver is configured to be in the same Load Balancing Group as the primary receiver being analyzed, step S37. If the spare receiver did not hear the modem response, step S38 No, then the UUT is not wired together with the primary receiver being analyzed and is not in the same Load Balancing Group. Since certain responses may be expected within a predetermined period of time, the process may preferably determine if a response has been received within a predetermined period of time after the communication request. The process repeats steps S32-S35 until the last UUT receiver is tested.

Those of skill in the art will appreciate that since the active receivers are not required to be used for testing, the process illustrated in FIG. 4 is non-intrusive to the cable network, and may be performed without cause a loss or disruption of service to subscribers. Even voice calls over the cable network should not be affected by any of the testing described above. The process in FIG. 4 may be performed periodically by a cable operator, e.g. once per week, every 24 hours, etc., and may also be initiated by a service call indicating problems or indicating a change in the cable network.

Figure 5:
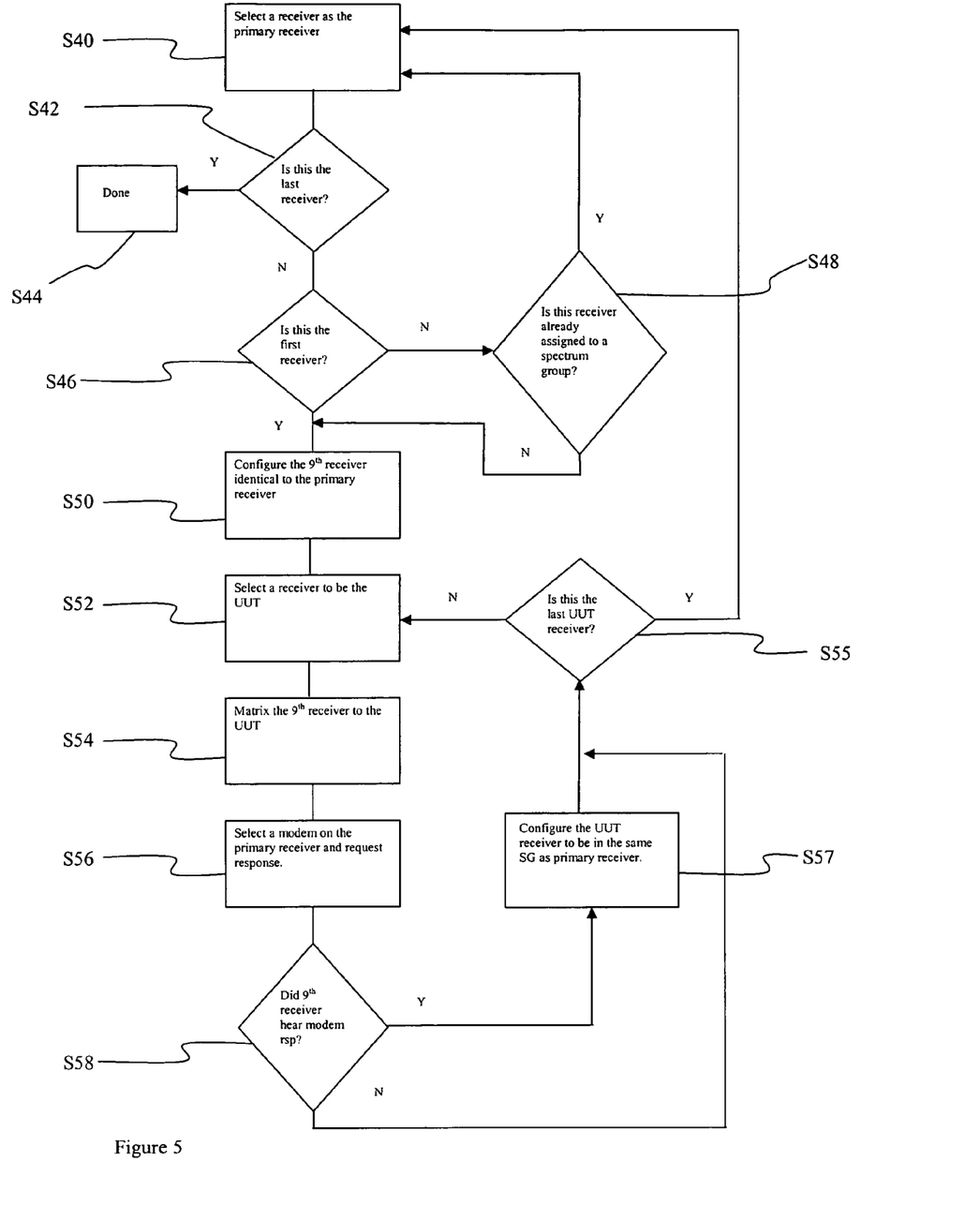
FIG. 5 illustrates an exemplary flow diagram of an exemplary process for determining Spectrum Groups according to the principles of the invention.

FIG. 5 illustrates an exemplary process for determining Spectrum Groups in the cable network. The process for determining Spectrum Groups is similar to the process illustrated in FIGS. 3 and 4, the discussions of which are herein incorporated. As illustrated in FIG. 4, a primary receiver is selected to start the process and a determination is made if the selected primary receiver is the last receiver or has already been assigned to a Spectrum Group, steps S40-S48, in which cases, the process ends or selects another primary receiver. If the selected receiver is not the last receiver, step S46 No, and the selected receiver has not already been assigned to a Load Balancing Group, step S48 No, then the process continues to analyze the selected primary receiver, step S28 No. As illustrated in step S50 the tunable spare receiver is preferably configured to the same communication parameters as the selected primary receiver, including being configured to communication characteristics of the same RF band and communication protocols (e.g. MAP data) utilized by the selected RF receiver being analyzed.

As further illustrated in FIG. 5, another primary receiver is selected as the receiver unit under test (UUT) and the UUT is tested, as illustrated in steps S52-S58, to determine if it is connected to the selected primary receiver in the same manner as described for steps S12-S18 in FIG. 3. Particularly, as illustrated in step S54, the spare receiver is connected (matrixed) to the UUT, e.g. to the line in of the UUT, a modem is selected which is registered with the receiver being analyzed (selected in step S40) and a communication signal requesting a response is sent from the transmission unit 5 to the modem. Those of skill in the art will appreciate that the communication signal may be a "ping", a station maintenance request or any other signal requesting a response. When the modem responds to the communication request, both the selected primary receiver and the spare receiver detect the response, if any, by the modem within a predetermined period of time. If the spare receiver hears the modem response, step S58 Yes, then the UUT may be configured to be in the same Spectrum Group as the primary receiver being analyzed, step S57. If the spare receiver did not hear the modem response, step S58 No, then the UUT is not wired together with the primary receiver being analyzed and is not in the same Spectrum Group. Since certain responses may be expected within a predetermined period of time, the process may preferably determine if a response has been received within a predetermined period of time after the communication request. The process repeats steps S52-S55 until the last UUT receiver is tested.

Those of skill in the art will appreciate that since the active receivers are not required to be used for testing, the process illustrated in FIG. 5 is non-intrusive to the cable network, and may be performed without causing a loss or disruption of service to subscribers or using active receivers. Even voice calls over the cable network should not be affected by any of the testing described above. The process in FIG. 5 may be performed periodically by a cable operator, e.g. once per week, every 24 hours, etc., and may also be initiated by a service call indicating problems or indicating a change in the cable network.

Figure 6:
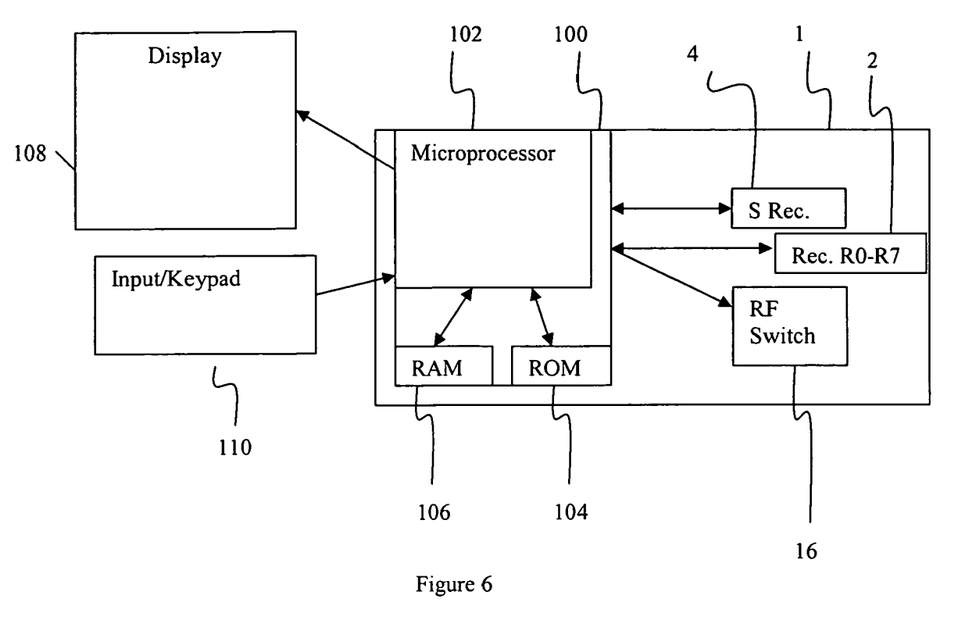
FIG. 6 illustrates an exemplary processing unit in accordance with the principles of the invention.

The processes in FIGS. 3-5 may be implemented in hard wired devices, firmware or software running in a processor. A processing unit for a software or firmware implementation is preferably contained in the CMTS. FIG. 6 illustrates an exemplary processing unit 100 contained in the CMTS. Processing unit 100 preferably contains a microprocessor 102 which may receive information, such as instructions and data, from a ROM 104 or RAM 106. Processing unit 100 is preferably connected to a display 108, such as a CRT or LCD display, which may display status information such as whether a UUT receiver is in the same Load Balancing Group or Spectrum Group as the selected primary receiver. An input keypad 110 may also be connected to processing unit 100 and may allow an operator to provide instructions, processing requests and/or data to processor 100. Microprocessor 102 is preferably configured to provide instructions to RF switch 16 (FIG. 2) to select a primary receiver to be analyzed and select other receivers as the UUT in accordance with the processes illustrated in FIGS. 3-5. Microprocessor 102 is also preferably configured to configure spare receiver 4 to match the communication characteristics of the selected primary receiver. The communication characteristics of each receiver 2 may be stored on ROM 104 or RAM 106, or may be provided from an external source, such as the headend. RAM 104 and/or ROM 106 may also carry instructions for microprocessor 102 to perform the processes illustrated in any or all of FIGS. 3-5.

Any of the processes illustrated in FIGS. 3-5 may be contained on a computer readable medium which may be read by microprocessor 102. A computer readable medium may be any medium capable of carrying instructions to be performed by a microprocessor, including a CD disc, DVD disc, magnetic or optical disc, tape, silicon based removable or non-removable memory, packetized or non-packetized wireline or wireless transmission signals.

Those of skill in the art will appreciate that using the spare receiver to matrix with any of the primary receiver's RF path may enable detection of problems in the cable network, such as removed, loose or damaged coaxial cables. After the CMTS is cabled and modems are registered this tool could be used to show the cable operators how their CMTS is really physically wired. If there were any wiring mistakes such as incorrect cabling or loose cables we could detect them for the operator and they can make the appropriate changes. This could also help prevent having the cable company from rolling a truck to attempt to fix a problem that is really in the head end. This will help cable operators debug cabling possible issues within their headend.

The principles of the invention may also be used to periodically run a diagnostic of the cable network to ensure the operators that their cable connections are still intact. This will result in less down time and loss of service to subscribers. For example, if all of a sudden several modems started to deregister a technician could run a diagnostic program on our processing unit 100 to determine the integrity of the wiring. If the results verify what the technician thinks is the correct wiring then they can eliminate a wiring issue and move on to find the real cause of the problem. In this manner, the present invention provides a way for cable operators to automatically determine how their RF cabling is wired to the numerous ports on CMTS cards residing in the network without interrupting the network service.

The invention claimed is:

1. An apparatus for managing a network comprising:
   a transmission unit configured to transmit signals according to predetermined communication parameters;
   a plurality of receivers, each receiver being configured to receive signals according to predetermined communication parameters, each receiver having different communication parameters from each other receiver of the plurality of receivers;
   a spare receiver configurable to receive signals using the predetermined communication parameters of each of the plurality of receivers; and
   a switching unit which selectively connects the spare receiver to a signal line associated with one of the plurality of receivers, the selectively connected receiver of the plurality of receivers being a receiver under test, enabling the spare receiver to receive signals sent to the receiver under test, and
   a microprocessor which configures communication parameters of the spare receiver to match communication parameters of an analyzed receiver selected from the plurality of receivers other than the receiver under test,
   wherein the receiver under test is determined to be connected to the analyzed receiver when the spare receiver receives a communication using the communication parameters of the analyzed receiver and while the spare receiver is connected to the receiver under test.

2. The apparatus of claim 1, wherein the microprocessor instructs the transmission unit to a request for a response to a modem connected to the network, instructing the modem to respond to the analyzed receiver using the predetermined communication parameters of the analyzed receiver, and the receiver under test is determined to be connected to the analyzed receiver if the spare receiver receives a response from the modem to the request for a response.

3. The apparatus of claim 1, wherein when the receiver under test is determined to be connected to the analyzed receiver, the receiver under test is determined to be in the same Load Balancing Group as the analyzed receiver.

4. The apparatus of claim 1, wherein when the receiver under test is determined to be connected to the analyzed receiver, the receiver under test is determined to be in the same Spectrum Group as the analyzed receiver.

5. A method of controlling a network having a plurality of receivers and a spare receiver comprising:
   configuring, using a microprocessor, communication parameters of the spare receiver to match communication parameters of an analyzed receiver selected from the plurality of receivers; connecting, via a switching unit, the spare receiver to a signal line associated with a receiver under test, the receiver under test being a receiver of the plurality of receivers different from the analyzed receiver;
   providing a request for information from a transmission unit to a modem connected to the analyzed receiver; and
   determining, using a processing unit, if the spare receiver detects a response from the modem, wherein the receiver under test is determined to be connected to the analyzed receiver when the spare receiver receives a communication from the modem while the spare receiver is connected to the receiver under test and the communication parameters of the spare receiver match communication parameters of the analyzed receiver.

6. The method of claim 5, wherein if the spare receiver detects a response from the modem, the receiver under test is determined to be wired to the analyzed receiver.

7. The method of claim 5, wherein if the spare receiver detects a response from the modem, the receiver under test is determined to be in a Load Balancing Group with the analyzed receiver.

8. The method of claim 5, wherein if the spare receiver detects a response from the modem, the receiver under test is determined to be in a Spectrum Group with the analyzed receiver.

9. A non-transitory computer readable medium containing instructions for a processor to control a network having a plurality of receivers and a spare receiver, the computer readable medium containing instructions that, when executed by the processor, cause the processor to:
   configure communication parameters of the spare receiver to match communication parameters of an analyzed receiver selected from the plurality of receivers;
   connect the spare receiver to a signal line associated with a receiver under test, the receiver under test being a receiver of the plurality of receivers different from the analyzed receiver;
   provide a request for information from a transmission unit to a modem connected to the analyzed receiver; and
   determine if the spare receiver detects a response from the modem,
   wherein the receiver under test is determined to be connected to the analyzed receiver when the spare receiver receives a communication from the modem while the spare receiver is connected to the receiver under test and the communication parameters of the spare receiver match communication parameters of the analyzed receiver.

10. The non-transitory computer readable medium of claim 9, wherein if the spare receiver detects a response from the modem, the receiver under test is determined to be wired to the analyzed receiver.

11. The non-transitory computer readable medium of claim 9, wherein if the spare receiver detects a response from the modem, the receiver under test is determined to be in a Load Balancing Group with the analyzed receiver.

12. The non-transitory computer readable medium of claim 9, wherein if the spare receiver detects a response from the modem, the receiver under test is determined to be in a Spectrum Group with the analyzed receiver.

* * * * *